US008938257B2

(12) United States Patent
Chao et al.

(10) Patent No.: US 8,938,257 B2
(45) Date of Patent: Jan. 20, 2015

(54) LOGO DETECTION FOR INDOOR POSITIONING

(75) Inventors: Hui Chao, San Jose, CA (US); Nan Hu, Stanford, CA (US); Saumitra Mohan Das, San Jose, CA (US); Rajarshi Gupta, Sunnyvale, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 212 days.

(21) Appl. No.: 13/486,359

(22) Filed: Jun. 1, 2012

(65) Prior Publication Data
US 2013/0045751 A1 Feb. 21, 2013

Related U.S. Application Data

(60) Provisional application No. 61/525,704, filed on Aug. 19, 2011.

(51) Int. Cl.
*H04W 4/02* (2009.01)
*G06F 17/30* (2006.01)
*G01C 21/20* (2006.01)
*G01C 21/36* (2006.01)

(52) U.S. Cl.
CPC ........ *G06F 17/30528* (2013.01); *G01C 21/206* (2013.01); *G01C 21/3602* (2013.01)
USPC ..................................................... 455/456.1

(58) Field of Classification Search
CPC .................................. H04W 4/02; H04W 4/04
USPC ........................................... 455/456.1, 404.2
See application file for complete search history.

(56) References Cited

U.S. PATENT DOCUMENTS

| 6,175,644 B1 | 1/2001 | Scola et al. |
| 7,672,669 B2 | 3/2010 | Alexander et al. |
| 7,707,239 B2* | 4/2010 | Anderson et al. ............. 709/202 |
| 7,818,123 B2 | 10/2010 | Inoue et al. |
| 8,150,367 B1* | 4/2012 | Malladi et al. ............. 455/404.2 |

(Continued)

FOREIGN PATENT DOCUMENTS

| DE | 10248534 A1 | 4/2004 |
| EP | 2120009 A1 | 11/2009 |

(Continued)

OTHER PUBLICATIONS

International Search Report and Written Opinion—PCT/US2012/050045—ISA/EPO—Nov. 21, 2012.

*Primary Examiner* — Qun Shen
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for logo detection for indoor positioning for use in or with a mobile device. Briefly, in accordance with one implementation, a method may include extracting, at a mobile device, visual features from one or more images captured via a camera sensor of the mobile device; and estimating a location of the mobile device based, at least in part, on a match between extracted visual features and one or more brand-specific visual signatures associated with one or more points of interest of one or more known locations. In some instances, an estimated location of a mobile device may be refined based, at least in part, on at least one additional POI of one or more POIs of one or more known locations.

28 Claims, 9 Drawing Sheets

(56) References Cited

U.S. PATENT DOCUMENTS

| | | |
|---|---|---|
| 8,190,730 B2 * | 5/2012 | Dempsey .................. 709/224 |
| 8,238,671 B1 | 8/2012 | Babenko et al. |
| RE43,689 E * | 9/2012 | Pohja et al. ............... 455/41.2 |
| 8,478,226 B2 * | 7/2013 | Bakker et al. ............ 455/404.2 |
| 8,611,592 B2 | 12/2013 | Wallace et al. |
| 8,634,848 B1 * | 1/2014 | Bozarth et al. ........... 455/456.1 |
| 2003/0210168 A1 | 11/2003 | Ruszkowski, Jr. |
| 2005/0288859 A1 | 12/2005 | Golding et al. |
| 2007/0233380 A1 | 10/2007 | Tanaka |
| 2008/0268876 A1 * | 10/2008 | Gelfand et al. ............ 455/457 |
| 2009/0083237 A1 | 3/2009 | Gelfand et al. |
| 2009/0083275 A1 | 3/2009 | Jacob et al. |
| 2009/0318168 A1 | 12/2009 | Khosravy et al. |
| 2010/0009700 A1 | 1/2010 | Camp, Jr. et al. |
| 2010/0092093 A1 | 4/2010 | Akatsuka et al. |
| 2010/0130144 A1 | 5/2010 | Narathong et al. |
| 2010/0228632 A1 | 9/2010 | Rodriguez |
| 2010/0250126 A1 | 9/2010 | Epshtein et al. |
| 2010/0309225 A1 | 12/2010 | Gray et al. |
| 2011/0019587 A1 * | 1/2011 | Wang .......................... 370/254 |
| 2011/0038540 A1 | 2/2011 | Ahn et al. |
| 2011/0066646 A1 * | 3/2011 | Danado et al. ............... 707/770 |
| 2011/0256881 A1 * | 10/2011 | Huang et al. ............. 455/456.1 |
| 2011/0312309 A1 | 12/2011 | Makkonen |
| 2011/0314049 A1 | 12/2011 | Poirier et al. |
| 2012/0045992 A1 | 2/2012 | Kwon |
| 2012/0183172 A1 | 7/2012 | Stroila |
| 2012/0270573 A1 | 10/2012 | Marti et al. |
| 2013/0035110 A1 * | 2/2013 | Sridhara et al. .......... 455/456.1 |
| 2013/0212094 A1 | 8/2013 | Naguib |

FOREIGN PATENT DOCUMENTS

| | | | |
|---|---|---|---|
| EP | 2219367 A1 * | 8/2010 | ............ H04N 5/232 |
| EP | 2455713 A1 | 5/2012 | |
| WO | WO-03032005 A2 | 4/2003 | |
| WO | WO-2009040688 A2 | 4/2009 | |
| WO | 2010105186 A1 | 9/2010 | |

* cited by examiner

LOGO DETECTION FOR INDOOR POSITIONING

CROSS-REFERENCE TO RELATED APPLICATIONS

The present application claims priority under 35 U.S.C. §119 to U.S. Provisional Application Ser. No. 61/525,704, entitled "Method and/or Apparatus for Position Estimation," filed on Aug. 19, 2011, which is assigned to the assignee hereof and which is expressly incorporated herein by reference.

BACKGROUND

1. Field

The present disclosure relates generally to position estimation techniques and, more particularly, to logo detection for indoor positioning for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing position information obtained or gathered from various systems. For example, in an outdoor environment, certain mobile communication devices may obtain a position estimate or so-called "position fix" by acquiring wireless signals from a satellite positioning system (SPS), such as the global positioning system (GPS) or other like Global Navigation Satellite System (GNSS), cellular base station, location beacon, or the like via a cellular telephone or other wireless communications network. In some instances, received wireless signals may be processed by or at a mobile communication device, and its location may be estimated using known techniques, such as, for example, Advanced Forward Link Trilateration (AFLT), base station identification, or the like.

In an indoor environment, at times, mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, etc.), which may at least partially preclude their use for position estimations. As such, in an indoor environment, different techniques may be employed to enable navigation or location services. For example, a mobile communication device may obtain a position fix by measuring ranges to three or more terrestrial wireless access points positioned at known locations. Ranges may be measured, for example, by obtaining a Media Access Control identifier (MAC ID) address from wireless signals received from suitable access points and measuring one or more characteristics of received signals, such as signal strength, round trip delay, or the like. A position of a mobile communication device, such as in an indoor environment, for example, may also be estimated via heat map or radio map signature matching. For example, current or live characteristics of wireless signals received at a mobile communication device may be compared with expected or previously measured signal characteristics stored as heat map values in a database. By finding a signature in a database that more closely matches characteristics exhibited by signals currently received at a mobile communication device, a location associated with a matching signature may be used as an estimated location of the device.

In some instances, however, such as, for example, in larger indoor or like areas, relatively dense environments prone to multipath or fading effects (e.g., shopping malls, retailer outlets, etc.), or the like, access point or like wireless transmitter distribution may be less than sufficient or adequate for accurate or otherwise suitable positioning. In addition, at times, pre-measuring signal characteristics so as to construct a heat map for a particular indoor area of interest may be labor-intensive, time-consuming, costly, etc. Also, once constructed, heat maps tend to be rather static and, as such, may be difficult or expensive to update or reconstruct in a relatively dynamic environment associated with a corresponding physical location. Accordingly, how to improve or otherwise enhance position accuracy, such as in an indoor or like environment (e.g., urban canyons, etc.), for example, continues to be an area of development.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
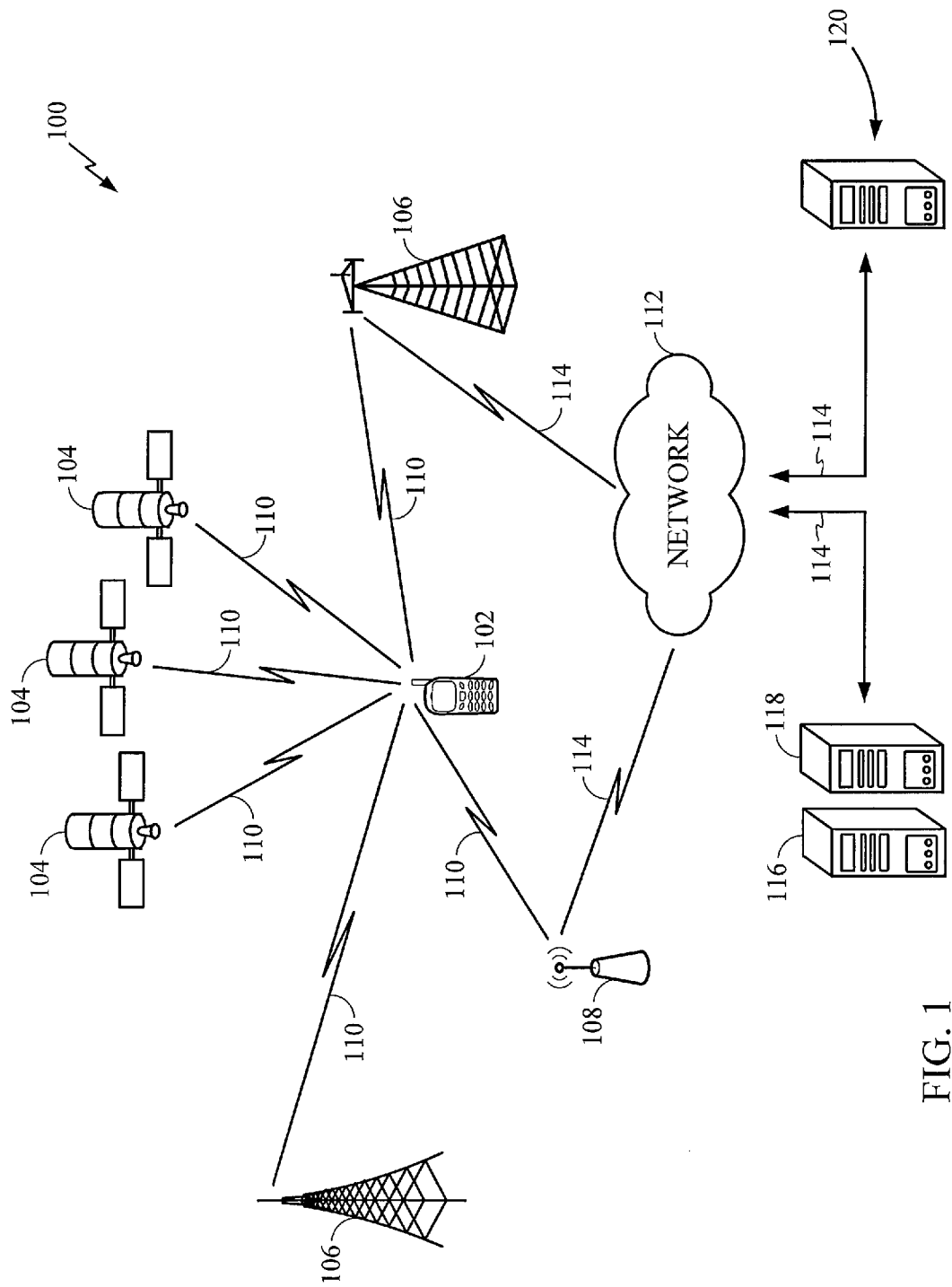
FIG. 1 is a schematic diagram illustrating features associated with an implementation of an example operating environment.

Example implementations relate to logo detection for indoor positioning for use in or with a mobile communication device. In one implementation, a mobile-based method for estimating a location of a mobile device may comprise receiving, at the mobile device, one or more brand-specific visual signatures associated with one or more points of interest (POIs) of one or more known locations; extracting visual features from one or more images captured via a camera sensor of the mobile device; matching extracted visual features and one or more received brand-specific visual signatures; and estimating a location of the mobile device based, at least in part, on a match between extracted visual features and one or more brand-specific visual signatures associated with one or more POIs of one or more known locations.

In another implementation, an apparatus may comprise a mobile device comprising a wireless transceiver to receive visual assistance information; a camera sensor to capture one or more images; and at least one image processing module coupled to a memory to process one or more images to extract visual features from one or more images captured via the camera sensor; and to estimate a location of the mobile device based, at least in part, on a match between extracted visual features and one or more brand-specific visual signatures associated with one or more POIs of one or more known locations.

In yet another implementation, an apparatus for estimating a location of a mobile device may comprise receiving means for receiving, at the mobile device, one or more brand-specific visual signatures associated with one or more points of interest (POIs) of one or more known locations; extraction means for extracting visual features from one or more images captured via a camera sensor of the mobile device; matching means for matching extracted visual features and one or more received brand-specific visual signatures; and estimation means for estimating a location of the mobile device based, at least in part, on a match between extracted visual features and one or more brand-specific visual signatures associated with one or more POIs of one or more known locations.

In yet another implementation, an article may comprise a non-transitory storage medium having instructions stored thereon executable by a special purpose computing platform at a mobile device to extract visual features from one or more images captured via a camera sensor of the mobile device; and estimate a location of the mobile device based, at least in part, on a match between the extracted visual features and one or more brand-specific visual signatures associated with one or more POIs of one or more known locations. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for logo detection for positioning in an indoor or like environment, for example, that may be used in or with a mobile communication device. As used herein, "mobile communication device," "wireless device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information over suitable communications networks according to one or more communication protocols. As a way of illustration, special purpose mobile communication devices, which may herein be called simply mobile devices, may include, for example, cellular telephones, satellite telephones, smart telephones, personal digital assistants (PDAs), laptop computers, personal entertainment systems, tablet personal computers (PC), personal audio or video devices, personal navigation devices, or the like. It should be appreciated, however, that these are merely illustrative examples of mobile devices that may be utilized in connection with logo detection for indoor positioning, and that claimed subject matter is not limited in this regard.

As alluded to previously, a mobile device may feature a location-aware capability allowing the device to estimate its geographic location using applicable position estimation techniques, such as, for example, trilateration, triangulation, heat map or radio map signal signature matching, or the like. In some instances, in addition to a location-aware capability, a mobile device may, for example, feature a live video image capturing capability. For example, a mobile device may comprise a camera sensor or like image capturing device capable of capturing a live video image for concurrent or real-time display of such an image in a screen or display associated with the mobile device. As used herein, "real time" may refer to amount of timeliness of content or information, which has been delayed by an amount of time attributable to electronic communication as well as other information processing.

As will be seen, an image capturing capability may be used, at least in part, to estimate a position of a mobile device, such as via logo detection, for example, in an indoor or like environment. As used herein, "logo," "visual signature," "brand-specific visual signature," or "textual label" may be used interchangeably and may refer to one or more visual elements capable of being identified or recognized based, at least in part, on their relatively uniform representation or consistency of use, in commerce or otherwise. In some instances, a logo may be associated with a good or service being provided at one or more points of interest (POIs), such as stores, coffee shops, retailer outlets, banks, or the like so as to distinguish such a good or service from other goods or services, for example, or indicate a source of such a good or service. At times, a logo may be associated with a suitable infrastructure, such as an urban planning or transportation-related infrastructure, for example, provided at one or more points of interest, such as a street corner, intersection, building, or the like. A logo may also be representative of a characteristic of a suitable infrastructure, such as, for example, a particular portion of a building exterior (e.g., façade, side, back, etc.), just to illustrate another possible implementation. In other words, in the context of the present specification, "logo" is to be interpreted broadly and may comprise any visual element that may be identified, such as electronically via one or more computer vision or like approaches, for example, that may facilitate or support one or more positioning operations in an indoor or like environment.

As a way of illustration, a logo may comprise, for example, a trademark, trade name, trade dress of a building (e.g., façade, storefront, etc.), signage (e.g., traffic sign, street designation, regulatory pictograph, etc.), logotype or wordmark, symbol, icon, emblem, badge, or the like. In some instances, a logo may, for example, be identified or recognized based, at least in part, on its uniformity or consistency of use with respect to its shape, color, size, text, text size, placement or arrangement of visual elements, or the like. At times, a logo may comprise, for example, a dynamic logo, meaning that content or context of such a logo may change depending on a particular setting, time of day, season, location, lighting conditions, good, service, or the like. By way of example but not limitation, in some instances, brand-specific visual signatures, such as Gap®, GapOutlet®, GapKids®, babyGap®, GapMaternity®, or the like may be representative of a dynamic logo. It should be appreciated that variations of a dynamic logo may or may not be considered different logos, which may depend, at least in part, on an application, environment, visual feature extraction techniques, logo detection approaches, or the like. Of course, these are merely examples relating to a logo, and claimed subject matter is not so limited.

As previously mentioned, in some instances, such as, for example, in larger indoor or like areas, relatively dense environments (e.g., shopping malls, factory outlets, etc.), etc., certain mobile devices may be unable to reliably receive or acquire requisite wireless signals from known transmitters so as to facilitate or support accurate or otherwise sufficient positioning. For example, wireless signals may be attenuated or otherwise affected in some manner (e.g., insufficient, weak, fragmentary, blocked, etc.), which may preclude their use in a given position estimation technique. As such, at times, positioning capabilities of certain mobile devices may be less useful or possibly faulty. It should be noted that the terms "position" and "location" may be used interchangeably herein.

Providing certain assistance information, such as a digital map of an area of interest (e.g., a floor plan of a shopping mall, etc.) in conjunction with a rough location, for example, may partially help with mobile device localization by establishing, for example, some context, frame of reference, etc. Thus, a mobile device may, for example, roughly estimate that an associated user is located within a particular building, a portion of a building, on a particular floor, etc. of an area of interest (e.g., near the Food Court, North end, etc. of the Washington Square Mall, etc.). To facilitate or support more accurate or otherwise sufficient indoor positioning, however, at times, some additional information from known reference points (e.g., signal strength, round trip delay, etc.), such as access points, wireless tags, grid points, etc. may be needed or otherwise useful, as previously mentioned. Inadequate or less than sufficient distribution of wireless transmitters, however, such as within larger or denser indoor areas may, for example, decrease or otherwise affect accuracy of an estimated location, as was also indicated. In some instances, heat map-related information, if available, may be useful, but may be quite voluminous or comprehensive so as to tax available bandwidth in wireless communication links, memory space, battery life, etc. of a mobile device. Accordingly, it may be desirable to develop one or more methods, systems, or apparatuses that may facilitate or support more accurate, precise, robust, or otherwise useful positioning, such as, for example, in an indoor or like environment.

In an implementation, a set of suitable logos, such as reference logos indicative of one or more known POIs mapped to a floor plan of a particular indoor or like area of interest, for example, may be obtained. As described below, reference logos may, for example, be matched against visual features extracted from one or more captured images of brand-specific visual signatures associated with one or more POIs concurrently shown in a camera view of a mobile device. An orientation of a mobile device may, for example, be determined, such as via one or more associated sensors, and a pose with respect to one or more shown POIs may be estimated. In some instances, a pose may, for example, be estimated based, at least in part, on a line of sight angle relative to one or more shown POIs. Based, at least in part, on an estimated pose and known locations of one or more POIs, such as one or more shown POIs mapped to a floor plan of a particular indoor or like area of interest and associated with matched visual features, for example, an estimated location of a mobile device may be computed. At times, an estimated location of a mobile device may, for example, be refined, such as via matching visual features of at least one additional POI concurrently shown in a live camera view, as will also be seen.

FIG. 1 is a schematic diagram illustrating features associated with an implementation of an example operating environment 100 capable of facilitating or supporting one or more processes or operations for position estimation of a mobile device 102, such as via logo detection, for example. It should be appreciated that operating environment 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, operating environment 100 may comprise, for example, one or more satellites 104, base transceiver stations 106, wireless transmitters 108, etc. capable of communicating with mobile device 102 via wireless communication links 110 in accordance with one or more communication protocols. Satellites 104 may be associated with one or more satellite positioning systems (SPS), such as, for example, the United States Global Positioning System (GPS), the Russian GLONASS system, the European Galileo system, as well as any system that may utilize satellites from a combination of satellite systems, or any satellite system developed in the future. Base transceiver stations 106, wireless transmitters 108, etc. may be of the same or similar type, for example, or may represent different types of devices, such as access points, radio beacons, cellular base stations, femtocells, or the like, depending on an implementation. At times, one or more wireless transmitters, such as wireless transmitters 108, for example, may be capable of transmitting as well as receiving wireless signals.

In some instances, one or more base transceiver stations 106, wireless transmitters 108, etc. may, for example, be operatively coupled to a network 112 that may comprise one or more wired or wireless communications or computing networks capable of providing suitable or desired information, such as via one or more communication links 114. As will be seen, information may include, for example, assistance information associating relevant POIs with known locations within an indoor or like area of interest and brand-specific visual signatures attributed to these POIs, just to illustrate one possible implementation. At times, assistance information may include, for example, identities or locations of one or more base transceiver stations 106, wireless transmitters 108, or the like to facilitate or support one or more operations or processes associated with operating environment 100. As a way of illustration, assistance information may, for example, be provided in the form of a digital map, look-up table, mathematical formula, suitable model, algorithm, etc., which may depend, at least in part, on an application, network, environment, logo detection or visual feature extraction technique, or the like. In an implementation, network 112 may be capable of facilitating or supporting communications between suitable computing platforms or devices, such as, for example, mobile device 102, one or more base transceiver stations 106, wireless transmitters 108, as well as one or more servers associated with operating environment 100. In some instances, servers may include, for example, a location server 116, visual assistance server 118, as well as one or more other servers, indicated generally at 120 (e.g., navigation, information, map, etc. server, etc.), capable of facilitating or supporting one or more operations or processes associated with operating environment 100.

As will be described in greater detail below, location server 116 may provide a rough location of mobile device 102, such as within an indoor or like area of interest, for example, associated with operating environment 100. In addition, at times, location server 116 may, for example, provide a location context identifier (LCI) for a particular indoor or like area of interest, as will also be seen. For example, an LCI may comprise or be associated with a locally defined area, such as a particular floor of a building or other indoor or like area of interest that is not mapped according to a global coordinate system, just to illustrate one possible implementation. Thus, in some instances, such as at or upon entry of an indoor or like area of interest, for example, mobile device 102 may communicate a request to location server 116 to provide one or more LCIs covering the area or adjacent areas, if desired. Here, a request may reference or otherwise include, for example, a rough location of mobile device 102, as was indicated, such that location server 116 may associate the rough location of mobile device 102 with indoor or like areas covered by one or more LCIs, and then communicate relevant LCIs to mobile device 102. In some instances, mobile device 102 may utilize one or more received LCIs having known locations, in whole or in part, in subsequent messages with a suitable server, such as server 120, for example, to obtain navigation, map, or like information relevant to an area identified by one or more relevant LCIs (e.g., a digital map, locations or identifies of wireless transmitters, radio or heat maps, routeability graphs, etc.). As will also seen, visual assistance server 118 may, for example, provide visual assistance information, such as a table, graph, or like information structure associating brand-specific visual signatures with one or more relevant POIs having known locations, though claimed subject matter is not so limited. For example, in some instances, visual assistance information may comprise a set of logos representative of store names, brands, storefront appearances, etc. mapped to a floor plan of a particular indoor or like area of interest so as to identify one or more relevant POIs (e.g., stores, retailers, etc.) located within the area.

Even though a certain number of computing platforms or devices are illustrated herein, any number of suitable computing platforms or devices may be implemented to facilitate or otherwise support one or more techniques or processes associated with operating environment 100. For example, at times, network 112 may be coupled to one or more wired or wireless communications networks (e.g., Wi-Fi, etc.) so as to enhance a coverage area for communications with mobile device 102, one or more base transceiver stations 106, wireless transmitters 108, servers 116, 118, 120, or the like. In some instances, network 112 may facilitate or support femtocell-based operative regions of coverage, for example. Again, these are merely example implementations, and claimed subject matter is not limited in this regard.

As was indicated, to compute an estimated location of a mobile device, such as in connection with one or more logo detection operations, for example, in some instances, it may be useful to determine an orientation of the mobile device within an indoor or like environment. In this context, "orientation" may refer to a relative placement of a mobile device with respect to some frame of reference having, for example, a fixed point and a reference position. Typically, although not necessarily, an orientation may be defined or specified, at least in part, via one or more angles or vectors relative to a particular direction(s) or point(s), respectively, within an n-dimensional space. As will be seen, with knowledge of its orientation, a mobile device may, for example, be capable of estimating a pose relative to brand-specific visual signatures of one or more POIs shown in a live camera view of the device and may compute its position.

Thus, a mobile device may feature one or more sensors that may provide measurement signals to a suitable processor, such as an application processor associated with the device, for example, to facilitate or support one or more logo detection operations or techniques. For example, a mobile device may feature one or more accelerometers, gyroscopes, magnetometers, ambient light detectors, proximity sensors, barometers, etc. capable of measuring the direction of gravity, spatial orientation, linear or angular motion, ambient environment, or other force or field experienced by the device. Sensors may be utilized individually, for example, or may be used in combination with other sensors, such as to provide measurement signals indicative of an orientation, location (e.g., via barometric pressure measurements indicative of a venue floor, etc.), rough or otherwise, etc. of a mobile device, which may depend on an application, environment, logo detection or visual feature extraction approaches, or the like. This may at least partially facilitate or support mobile device localization, such as if a retail store, outlet, etc. of interest has multiple entrances, floors, storefronts, etc. with the same or similar brand-specific visual signatures, for example, as will be seen. For example, an accelerometer may sense a direction of gravity toward the center of the Earth and may detect or measure a motion with reference to one, two, or three directions often referenced in a Cartesian coordinate space as dimensions or axes X, Y, and Z. Optionally or alternatively, an accelerometer may also provide measurements of magnitude of various accelerations, for example. A gyroscope may utilize the Coriolis effect and may provide angular rate measurements in roll, pitch, or yaw dimensions and may be used, for example, in applications determining heading or azimuth changes. A magnetometer may measure the direction of a magnetic field in X, Y, Z dimensions and may be used, for example, in sensing true North or absolute heading in various navigation applications.

Figure 2:
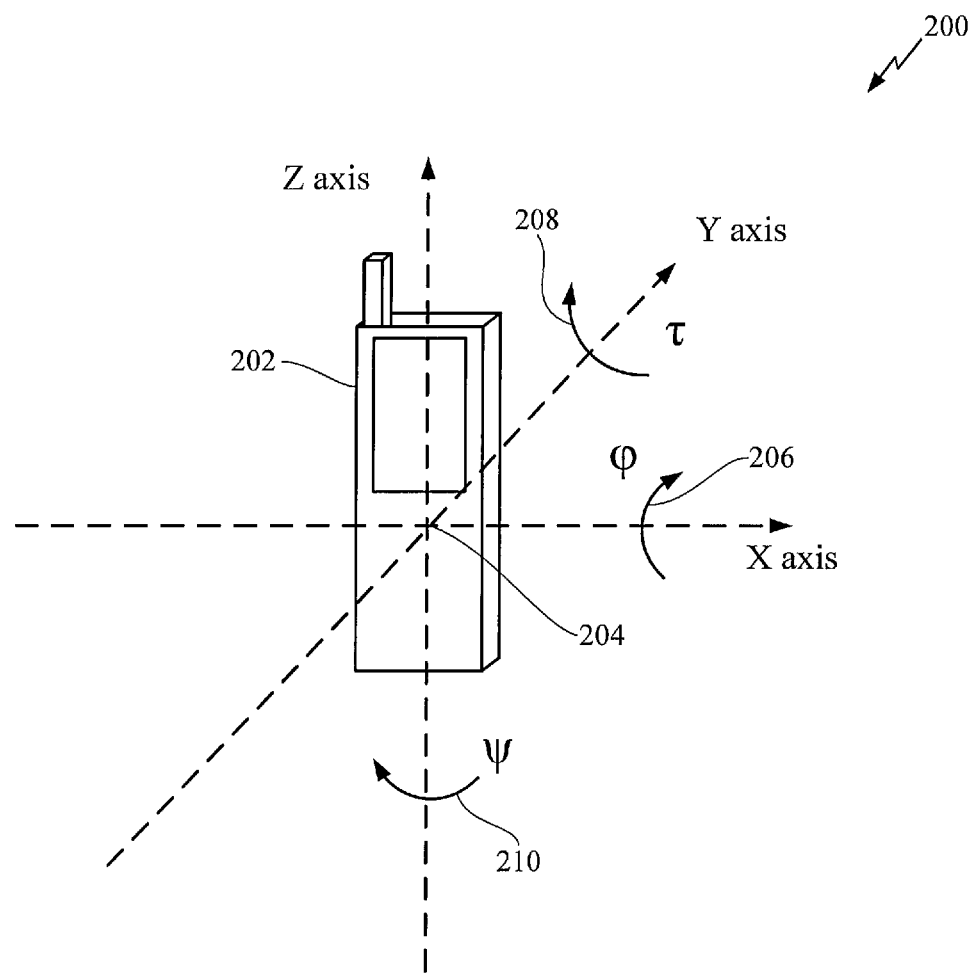
FIG. 2 is an implementation of an example coordinate system that may be used to facilitate or support logo detection for indoor positioning.

FIG. 2 illustrates an implementation of an example coordinate system 200 that may be used, in whole or in part, to facilitate or support one or more operations or techniques for logo detection for indoor positioning, such as an orientation of a mobile device 202, for example. As illustrated, example coordinate system 200 may comprise, for example, three-dimensional Cartesian coordinate system, though claimed subject matter is not so limited. Here, one or more translational aspects of motion of mobile device 202 may be detected or measured, at least in part, by a suitable accelerometer, such as a 3D accelerometer, for example, with reference to three dimensions or axes X, Y, and Z relative to an origin 204 of example coordinate system 200. One or more rotational aspects of motion of mobile device 202, such as orientation changes about gravity, for example, may also be detected or measured, at least in part, by a suitable accelerometer with reference to one or two dimensions. For example, rotational motion of mobile device 202 may be detected or measured in terms of coordinates $(\varphi, \tau)$, where phi $(\varphi)$ represents roll or rotation about an X axis, as illustrated generally by arrow at 206, and tau $(\tau)$ represents pitch or rotation about an Y axis, as illustrated generally at 208. Accordingly, here, a 3D accelerometer may detect or measure, at least in part, a direction of as well as a change about gravity with respect to roll or pitch dimensions, for example, thus, providing five dimensions of observability (X, Y, Z, $\phi$, $\tau$). It should be understood, however, that these are merely examples of various motions that may be detected or measured, at least in part, by an accelerometer with reference to example coordinate system 200, and that claimed subject matter is not limited to these particular motions or coordinate system.

At times, one or more rotational aspects of motion of mobile device 202 may, for example, be detected or measured, at least in part, by a suitable gyroscope capable of providing adequate degrees of observability, just to illustrate another possible implementation. For example, a gyroscope may detect or measure rotational motion of mobile device 202 with reference to one, two, or three dimensions. Thus, gyroscopic rotation may, for example, be detected or measured, at least in part, in terms of coordinates ($\phi$, $\tau$, $\psi$), where phi ($\phi$) represents roll or rotation 206 about an X axis, tau ($\tau$) represents pitch or rotation 208 about a Y axis, and psi ($\psi$) represents yaw or rotation about a Z axis, as referenced generally at 210. A gyroscope may typically, although not necessarily, provide measurements in terms of angular changes that may be used, at least in part, to determine a pose with respect to one or more POIs shown in a camera view, for example. Of course, details relating to various rotation motions with reference to example coordinate system 200 are merely examples, and claimed subject matter is not so limited.

It should be appreciated that an orientation of mobile device 202 may be determined or estimated in relation to any suitable coordinate system, such as, for example, a local coordinate system in which the origin or center of coordinates is fixed to and moves with mobile device 202. Optionally or alternatively, a global reference system utilizing, for example, a geo-centric or Earth-centered system of coordinates may be used, at least in part. At times, a relative coordinate system in which an axis of a reference frame may be fixed to or aligned with some structural element of an indoor or like area of interest, such as a hallway, corridor, etc. in a shopping mall, for example, may be employed. In some instances, a coordinate system may define dimensions that are mutually orthogonal. Of course, details relating to coordinate systems that may be used are merely examples, and claimed subject matter is not limited in this regard. It should also be noted that in some implementations mobile device 202 may include other sensors beyond sensors listed to facilitate or support one or more operations or processes for logo detection for indoor positioning. For example, mobile device 202 may include an ambient light detector, a proximity sensor, a temperature sensor, a barometric pressure sensor, a magnetic compass, or the like.

Figure 3:
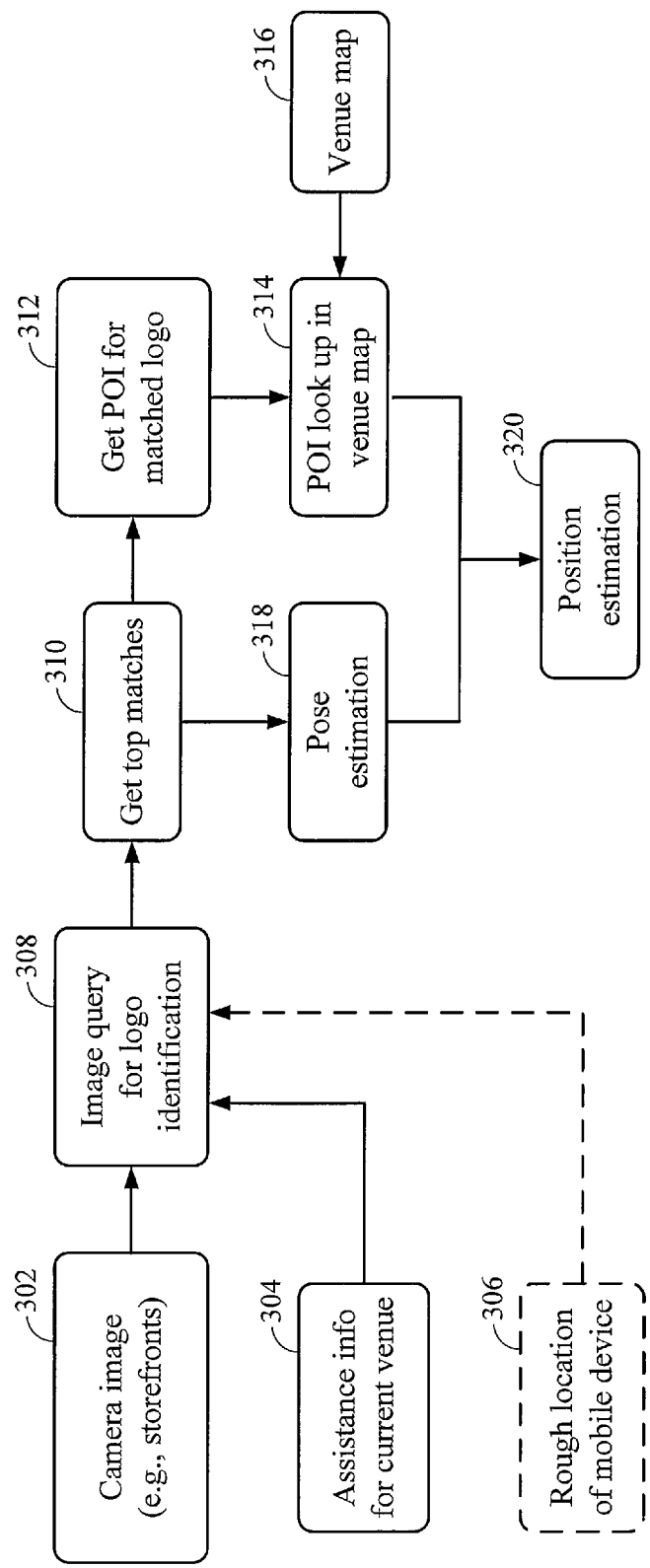
FIG. 3 is a flow diagram illustrating a summary of an implementation of an example process that may be performed in connection with logo detection for indoor positioning.

With this in mind, attention is now drawn to FIG. 3, which is a flow diagram illustrating a summary of an implementation of an example process 300 that may be performed, in whole or in part, to estimate a position of a mobile device, such as via logo detection, for example, in an indoor or like environment. It should be noted that information acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Figure 4:
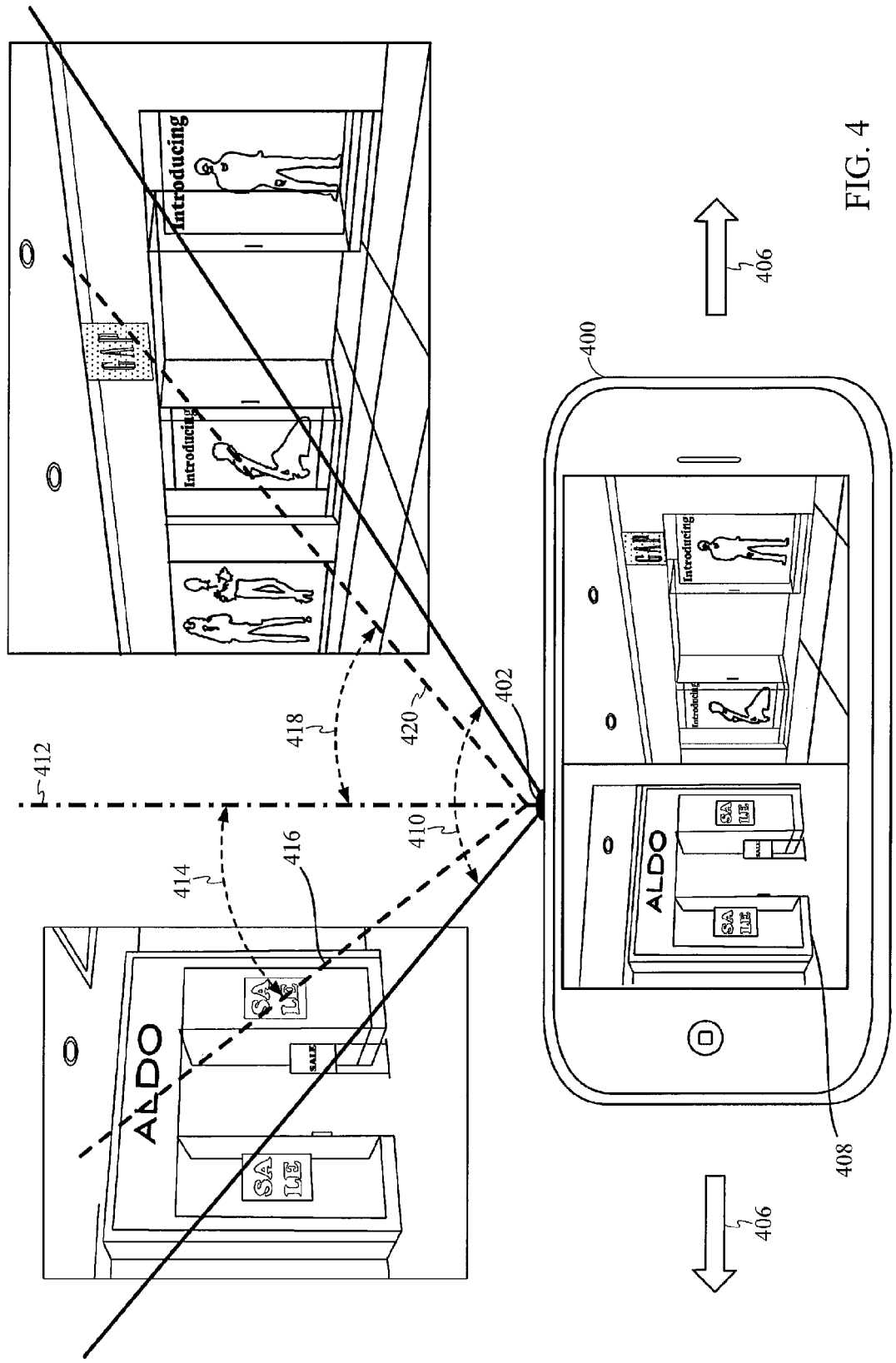
FIG. 4 is a schematic diagram illustrating an implementation of a mobile device capturing one or more logos of interest.

Example process may begin at operation 302, for example, with capturing a live video image of one or more logos indicative of one or more POIs associated with an indoor or like area of interest (e.g., storefronts, etc.) in a camera view of a mobile device. As was indicated, a video image may be captured via any suitable video sensing technology, such as a camera sensor or like device capable of capturing a live video image for concurrent or real-time display of such an image in a screen or display. For example, as illustrated in FIG. 4, a user of a mobile device 400 may point or aim an associated image capturing device, such as a camera sensor 402, for example, toward a particular storefront, logo, etc., or may pan around the surroundings, as referenced generally via arrows 406, concurrently viewing a live video image of an indoor or like environment in a display 408. Typically, although not necessarily, "panning" may refer to moving or manipulating a device, mobile or otherwise, to reposition or re-center content within a display area. For example, panning may be used to navigate through content that may be relatively large or small to be conveniently displayed or viewed within a display area. In this illustrated example, display 408 may be used, at least in part, as a viewfinder for camera sensor 402, for example, defining a field of view, indicated generally via a double-sided arrow at 410.

Continuing with FIG. 4, in an implementation, a series of video frames obtained, for example, via a panning sequence to view or capture one or more logos (e.g., Aldo®, Gap®, etc.) associated with an indoor or like area of interest may be captured. Video frames may be used, at least in part, to extract visual features from one or more captured images of logos concurrently shown in a camera view of mobile device 400 (e.g., Aldo®, Gap®, etc.) using any suitable computer vision or like visual feature extraction techniques. It should be noted that in some instances no camera actuation (e.g., taking a picture, etc.) may be needed or otherwise useful to extract visual features. For example, features associated with one or more logos may be extracted while panning, pointing, or otherwise moving mobile device 400. Visual features may be extracted using any suitable technique or approach, such as Scale-Invariant Feature Transform (SIFT), Speeded-Up Robust Feature (SURF), Nearest Feature Trajectory (NFT), etc., just to name a few examples, or proprietary corner detection-type techniques, for example. Claimed subject matter is not limited to these approaches, of course. In some instances, such as if certain extracted features are not sufficient or otherwise useful (e.g., for visual signature matching, computing a position, etc.), mobile device 400 may prompt a user for a repeated panning, panning at a slower rate, panning a larger area, or the like. It should be noted that visual feature extraction may be implemented at or by a mobile device suitable server (e.g., visual assistance server 118 of FIG. 1, etc.), or any combination thereof.

Referring back to FIG. 3, at operation 304, suitable assistance information, such as assistance information for a current venue, for example, may be obtained. In this context, current "venue" may refer to any suitable indoor or like area of interest associated with a mobile device, such as a locale, building (e.g., a shopping mall, retailer outlet, etc.), general area within a locale, building, etc., or other partially or substantially enclosed area (e.g., urban canyons, etc.). In some instances, assistance information may comprise, for example, identities or locations of wireless transmitters, reference points, etc. associated with a current venue, applicable map or venue information, or the like. Map or venue information may comprise, for example, a digital map (e.g., floor plans, etc.) of a venue associated with a mobile device identifying one or more structural features, such as walls, rooms, doors, passageways, elevators, staircases, ladders, floors, ceilings, etc. of the venue. Optionally or alternatively, map or venue information may be provided separately from other assistance information, such as at operation 316, for example, though claimed subject matter is not so limited.

As referenced at operation 306, in some instances, assistance information may comprise, for example, a rough location of a mobile device obtained based, at least in part, on a user input, recent position fix obtained from an SPS, or the like. As previously mentioned, a rough location may be useful in instances where a mobile device is unable to reliably receive or acquire requisite wireless signals from transmitters positioned at known locations, for example. At times, assistance information may, for example, be obtained via a communication with one or more suitable servers, such as servers 116, 118, or 120 of FIG. 1, though claimed subject matter is not so limited. For example, assistance information may be obtained upon request (e.g., by a mobile device, etc.), upon or after entering an indoor or like area of interest, pre-fetched or pre-loaded to a mobile device (e.g., in cache, memory, etc.) via any suitable push or pull technology, or the like. It should be noted that operation 306 may be optional in certain example implementations.

In some instances, based, at least in part, on a rough location of a mobile device, a location context identifier may, for example, be determined and provided for use by the device as part of or in connection with assistance information. As used herein, "location context identifier" (LCI) may refer to a particular portion of an indoor or like area of interest having a set of logos that may be relevant to or otherwise correspond with a rough location of a mobile device. For example, an LCI may comprise a section or wing of a shopping mall, a floor of a building, or like area around a rough location of a mobile device and having a set of logos identifying one or more POIs applicable to such a section, wing, floor, etc. By providing a portion of an area of interest with a smaller set of logos to identify one or more relevant POIs instead of a complete area with logos for all or most associated POIs, for example, a fewer computing or communication resources (e.g., bandwidth, memory, operating lifetime, download speed, etc.) may be advantageously utilized. Depending on an implementation, assistance information for an area covered by an LCI may, for example, be provided in the form of a suitable information structure capable of associating one or more relevant POIs, locations of relevant POIs, as well as brand-specific visual signatures attributed to these POIs.

Figure 5:
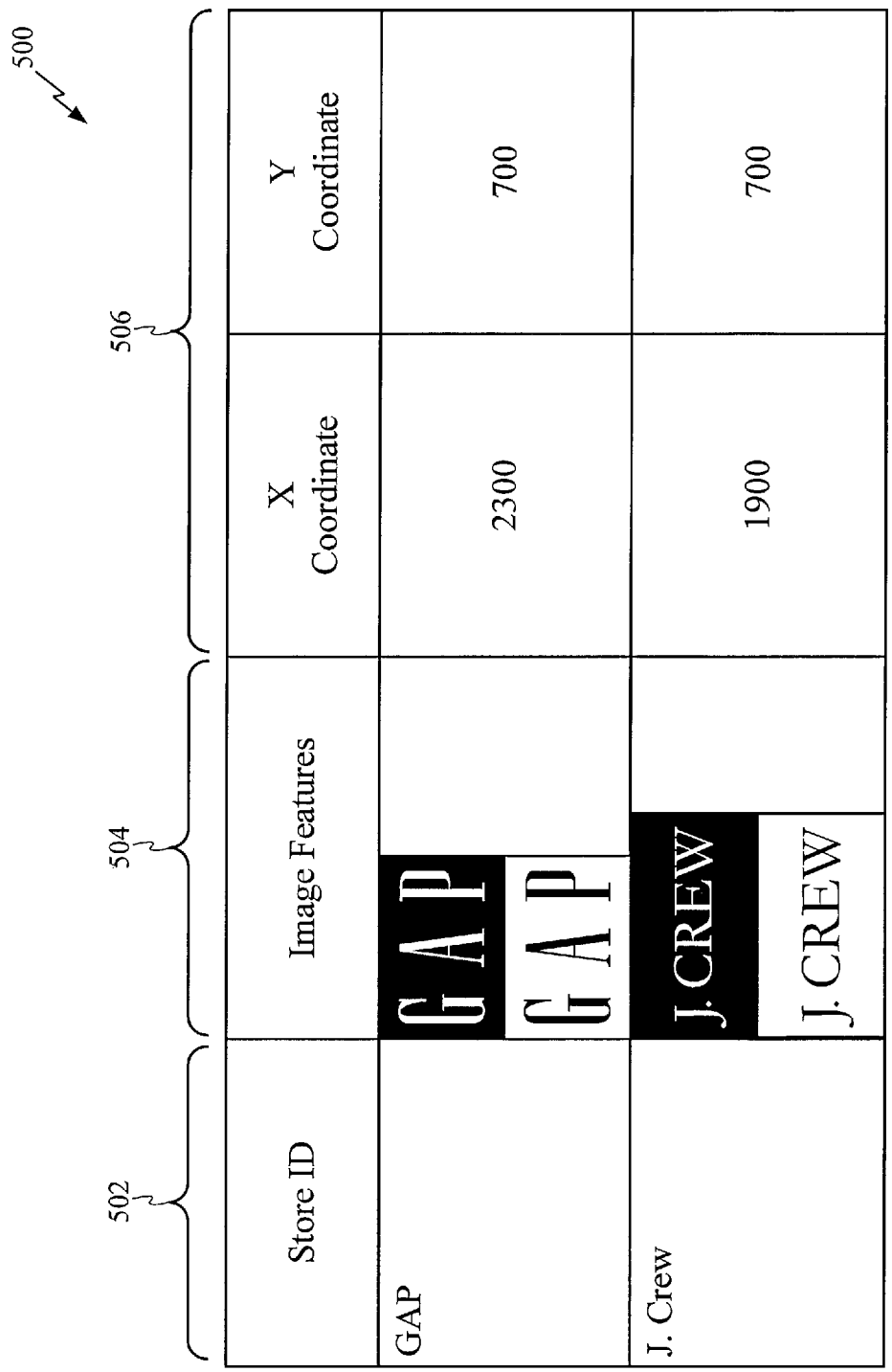
FIG. 5 is an implementation of an example information structure that may be used in connection with logo detection for indoor positioning.

By way of example but not limitation, an information structure that may be utilized, in whole or in part, in at least one implementation is illustrated in FIG. 5. As seen, an information structure may comprise, for example, a table 500 having a number of fields, such as a Store ID field 502, an Image Features field 504, as well as a Location Information field 506, though claimed subject matter is not so limited. Store ID field 502 may, for example, identify an indoor or like environment, such as a particular store associated with an LCI, Image Features field 504 may comprise visual features of brand-specific visual signatures derived from an image of a logo associated with such a store, and Location Information field 506 may comprise coordinates identifying a location of such a store (e.g., a POI, etc.). A store location may be identified with reference to any suitable coordinate system, such as a two-dimensional (X,Y), three-dimensional (X,Y,Z), etc. coordinate system relative to a local reference datum (e.g., a floor plan of a shopping mall, etc.), global reference datum (e.g., Earth-centered coordinates, etc.), or any combination thereof. In some instances, an information structure may, for example, be in the form of a digital map having a set of logos mapped to a floor plan of an area covered by an LCI so as to identify one or more relevant POIs located within the area, just to illustrate another possible implementation. Optionally or alternatively, an information structure may comprise, for example, a complete area of interest, such as a shopping mall, retailer outlet, etc. having a set of logos associating all or most POIs with locations attributed to these POIs within the area.

In some instances, assistance information, such as table 500, for example, may be derived from a larger database or like information repository comprising one or more brand-specific visual signatures used to identify suitable POIs. For example, a set of logos used by one or more business entities (e.g., a store chain, retail enterprise, etc.) to identify one or more storefronts (e.g., POIs, etc.) may be collected in a central database of brand-specific visual signatures using any appropriate techniques. A set of logos associating POIs with locations within an indoor or like area of interest may, for example, be furnished by an owner of a venue, obtained via crowd-sourcing, or the like. To illustrate, mall shoppers or patrons may execute desired tasks (e.g., provide logos, storefront images, associate POIs with locations, etc.) and be rewarded in some manner for doing so. In one implementation, a central database may comprise, for example, a visual assistance database associated with a suitable server, such as, for example, visual assistance server 118 of FIG. 1. For a given LCI, one or more logos for relevant POIs within a visual assistance database may, for example, be identified and extracted using one or more appropriate techniques. If an area covered by an LCI includes a POI that is associated with a particular business entity, such as a retail storefront for a store chain, for example, a representative brand-specific visual signature from a central database may be incorporated into assistance information, such as table 500.

Referring back to FIG. 3, at operation 308, an image query may be submitted, such as to a suitable server (e.g., server 118, 120, etc. of FIG. 1), for example, for logo identification. More specifically, visual features extracted from one or more captured images of logos of one or more POIs shown in a live camera view of a mobile device may be compared with reference logos in a suitable database (e.g., a visual assistance database, etc.) to determine if there is a match. As seen, in some instances, suitable assistance information, such as one or more parameters of an LCI or area of interest, rough location of a mobile device, or the like may be used or otherwise considered. At operation 310, such as in response to a query, one or more candidate reference images of logos having sufficiently similar visual features as one or more captured logo images may, for example, be identified as top matches using any suitable visual feature matching approach. For example, top matches may be identified based, at least in part, on a weighted comparison of metadata, context parameters (e.g., time of day, lighting conditions, etc.), visual features, etc. associated with applicable logo images, just to illustrate one possible implementation. If available, a best or otherwise suitable candidate image of a logo representative of a brand-specific visual signature associated with a POI shown in a live camera view may be selected, such as by or at a mobile device, suitable server, or the like.

With regard to operation 312, one or more suitable POIs, such as POIs known to be in an area around a rough location of a mobile device (e.g., identifiable by an LCI, etc.), for example, and associated with a matched logo may be identified. One or more identified POIs may be subsequently correlated with one or more POIs at one or more specific locations associated with a selected logo represented by a best or otherwise suitable candidate image, such as via a look up of one or more POIs in a venue map, for example, as referenced via operations 314 and 316.

At operation 318, with knowledge of a mobile device orientation, such as while video frames are being captured, for example, a pose with respect to one or more POIs shown in a live camera view may be estimated using one or more appropriate techniques. As a way of illustration, an analytic, geometric, algebraic, or like approaches utilizing one or more applicable algorithms or models (e.g., Levenberg-Marquardt, 3-point, 4-point, etc., pose from orthography and scaling with iterations (POSIT) algorithm, etc.) may be employed, in whole or in part. In some instances, a pose may, for example, be estimated based, at least in part, on a line of sight angle of a mobile device, such as relative to one or more POIs shown in a camera view and matching one or more brand-specific visual signatures of interest. For example, as schematically represented in FIG. 4, at times, a line of sight angle may be estimated in connection with an optical axis of camera lens, referenced via a dash-dotted line at 412, such as within any suitable plane (e.g., image plane, projection plane, etc.), just to illustrate one possible implementation. By way of example but not limitation, applying an orientation detection process by computing, for example, an orientation vector aligned with optical axis 412, a pose with respect to a brand-specific visual signature of Aldo® identifying an associated POI may be estimated via an angle 414 formed by optical axis 412 and a logo observation line 416. Likewise, a pose with respect to a brand-specific visual signature of Gap® identifying an associated POI may be estimated via an angle referenced at 418, for example, and formed by optical axis 412 and a logo observation line 420. Of course, these are merely details relating to pose estimation, and claimed subject matter is not so limited.

Referring back to FIG. 3, at operation 320, based, at least in part, on an estimated pose as well as a known location of a POI of interest (e.g., Aldo®, etc.) obtained in connection with a venue map, for example, an estimated position of a mobile device may be computed. In some instances, a position of a mobile device may, for example, be computed in connection with a suitable camera-view-and-venue-map-alignment-and-mapping process. For example, during a process, one or more known POIs may be aligned on a digital map of a particular venue and mapped into a common coordinate system (e.g., local, global, etc.) to represent or model a point of view of a camera (e.g., associated with a mobile device, etc.) whose location is a reference point of a user. Here, for example, any suitable alignment or mapping operations or techniques that may account for a topology (e.g., structural elements, area constraints, etc.) of a particular venue, potential position of a user relative to a logo based on a venue topology, etc. may be employed, in whole or in part. Alignment and mapping processes are generally known and need not be described here in greater detail.

In some instances, an estimated position of a mobile device may be refined, such as via matching visual features of at least one additional POI concurrently shown in a live camera view (e.g., Gap®, etc.), for example, utilizing one or more operations or processes discussed above. As a way of illustration, at times, a refined position of a mobile device, such as mobile device 400 of FIG. 4, for example, may be estimated to be at or proximate to an intersection (e.g., at a vertex, center of perspective, etc.) of logo observation lines, such as lines 416 and 420, though claimed subject matter is not so limited. In addition, in some instances, a distance from a suitable mobile device to one or more POIs of interest may be estimated, such as with knowledge of a size (e.g., actual, original, projected, etc.) of one or more detected logos, for example, using one or more appropriate techniques. It should be noted that one or more operations or processes associated with example process 300, such as, for example, visual feature extraction or matching, pose estimation, position computation, etc. may be implemented at or by a suitable server, mobile device, or any combination thereof.

Figure 6:
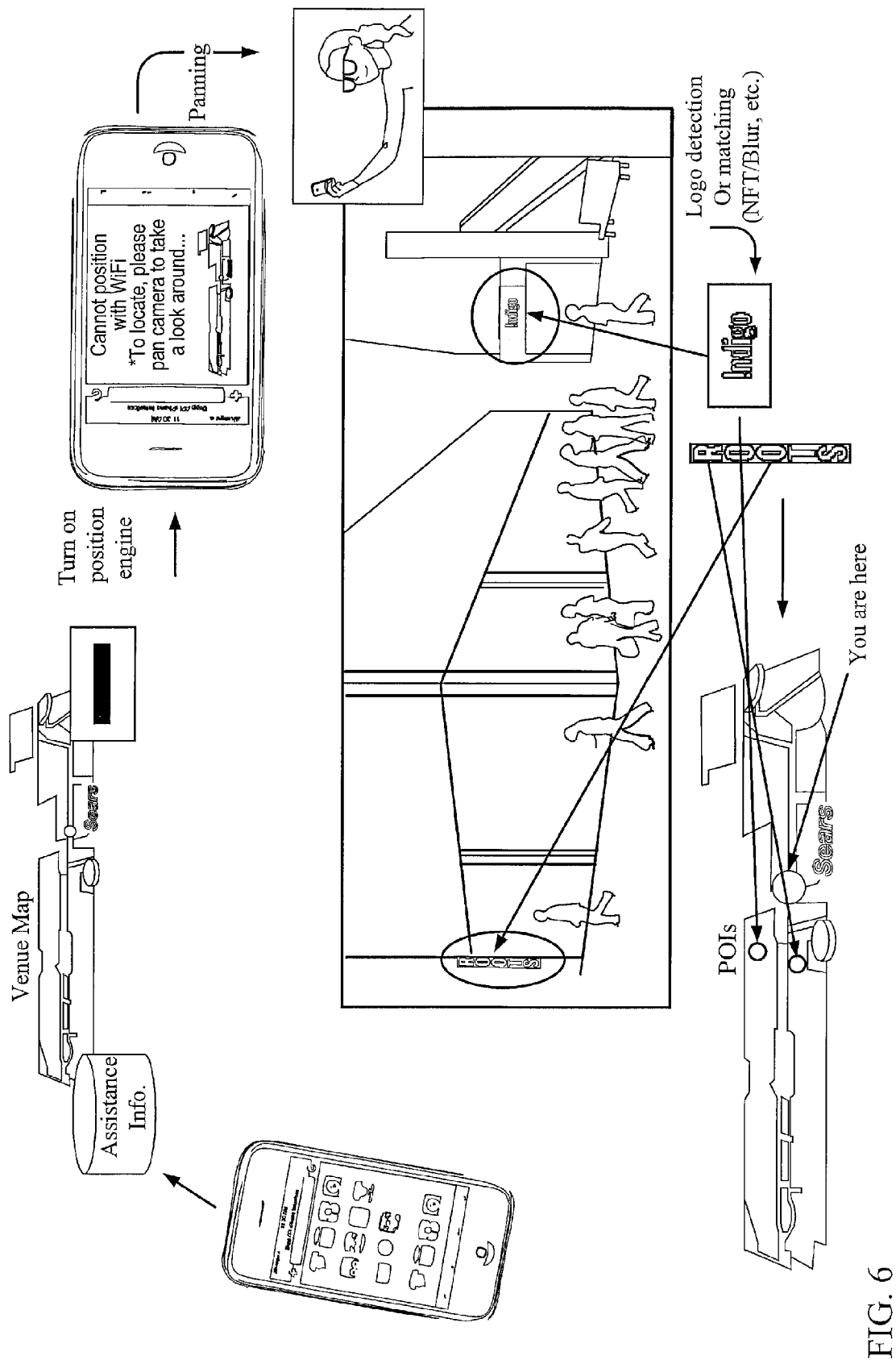
FIG. 6 is a flow diagram of an implementation of a process illustrating an example use case of estimating a position of a mobile device.

FIG. 6 is a flow diagram of an implementation of a process 600 illustrating an example use case or scenario of estimating a position of a mobile device via logo detection, such as in an indoor or like environment, for example, in which an LCI corresponds with an area that includes a rough location of the mobile device. As referenced at 602, having entered an area of interest, a user may turn on or activate a suitable position or navigation application hosted on a mobile device. A mobile device may, for example, communicate with a suitable server to obtain applicable assistance information for an LCI associated with the area based, at least in part, on a rough location of the device. A rough location of a mobile device may, for example, be obtained based, at least in part, on a recent position fix obtained via an SPS or other wireless transmitters (e.g., WiFi access points, etc.), one or more associated sensors (e.g., an accelerometer, gyroscope, barometer, etc.), or the like. As previously mentioned, this may, for example, be useful in determining a location of a mobile device if a retail store, outlet, etc. has multiple storefronts, entrances, floors, etc. identified via the same or similar logos. Optionally or alternatively, a rough location may, for example, be obtained via a user input, as was also indicated. Thus, as illustrated, assistance information may comprise, for example, a rough location of a mobile device, a digital map of a venue in conjunction with applicable POI information, such as one or more relevant logo images, visual features associated with the logos, locations of POIs, or the like.

As indicated at 604, if desired, a user may activate or turn on a suitable position engine or like application hosted on a mobile device, which may, for example, activate an associated image capturing device (e.g., a camera sensor, etc.). In some instances, a location of one or more wireless transmitters within an indoor or like area of interest, such as one or more access points associated with a local area network (e.g., WiFi, etc.), for example, may be unknown, as previously mentioned. Also, at times, signals from one or more known wireless transmitters may be attenuated or otherwise affected in some manner, such as insufficient, weak, fragmentary, or the like. This may, for example, preclude a mobile device from estimating its location, as was also indicated. In this illustrated example, a mobile device may display a suitable message (e.g., "Cannot position with WiFi," etc.) prompting a user to pan the device around its surroundings so as to implement one or more logo detection operations.

As illustrated at 606, in response to a message, a user may place a mobile device in a certain orientation recognizable or detectable, for example, by one or more associated sensors. Using a camera view, a user may pan or point a mobile device in various directions utilizing, for example, a camera sensor or like image capturing device so as to capture and concurrently display a live video image of an indoor or like area of interest in an associated screen or display. While panning or pointing a mobile device in various directions, a user may view a captured video image in a camera view until one or more suitable logos (e.g., Roots®, Indigo®, etc.) come into a user's field of view in a screen or display, as indicated generally at 608. Thus, a location of a mobile device and associated user may, for example, be estimated based, at least in part, on a possible region or area from which one or more POIs are visible.

As referenced at 610 and 612, respectively, an image of a captured logo (e.g., Roots®, etc.) may be processed in some manner, such as via one or more logo detection or matching operations discussed above, for example, and a POI associated with the logo may be identified, such as via a venue map in connection with a pose estimation operation, just to illustrate one possible implementation. Based, at least in part, on an estimated pose and a known location of a POI associated with a captured logo, an estimated location of a mobile device may be computed. At times, an estimated location of a mobile device may, for example, be refined based, at least in part, on at least one additional POI concurrently shown in a live camera view (e.g., Indigo®, etc.), as referenced generally at 614. Of course, details relating to an illustrated use case are merely examples to which claimed subject matter is not limited.

Accordingly, as discussed herein, logo detection for indoor positioning, such as in an indoor or like environment, for example, may provide benefits. For example, a smaller set of logos may advantageously satisfy location estimates in a larger number of venues (e.g., shopping malls, retailer outlets, etc.) without visiting or mapping each or otherwise suitable venue. In addition, as previously mentioned, a more accurate, precise, robust, or otherwise useful positioning, such as in an indoor or like environment may be advantageously achieved without, for example, taxing available bandwidth in wireless communication links, memory space or battery life of a mobile device, or the like. Of course, a description of certain aspects of logo detection for indoor positioning and its benefits is merely an example, and claimed subject matter is not so limited.

Figure 7:
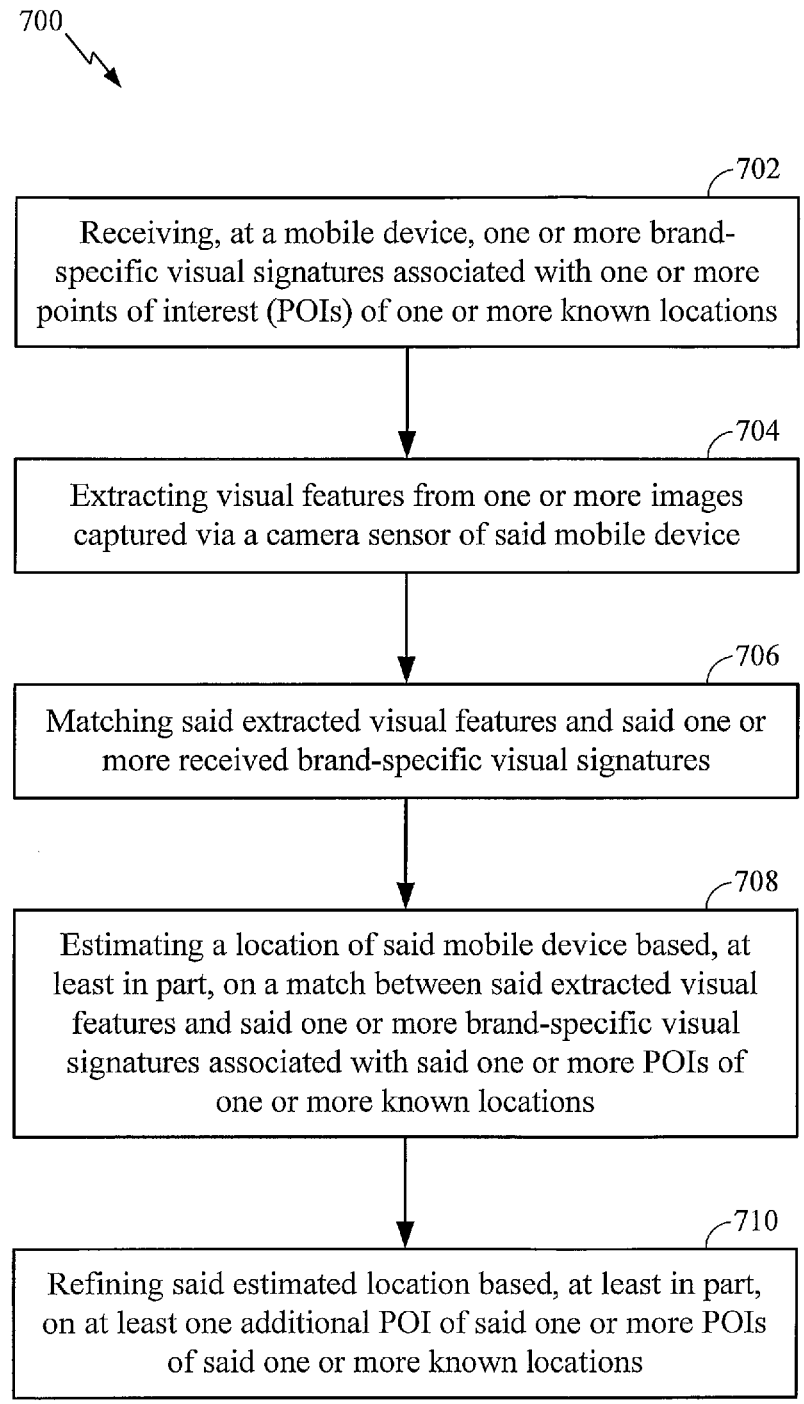
FIG. 7 is a flow diagram illustrating an implementation of an example process for logo detection for indoor positioning.

Attention is now drawn to FIG. 7, which is a flow diagram illustrating an implementation of an example process 700 that may be performed, in whole or in part, to facilitate or support one or more operations or techniques for logo detection for indoor positioning. It should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 700 may, for example, begin at operation 702 with receiving, at a mobile device, one or more brand-specific visual signatures associated with one or more points of interest (POIs) of one or more known locations. As was indicated, one or more brand-specific visual signatures may be derived from a suitable database, such as a visual assistance database accessible by a mobile device, for example, that may be used, at least in part, to associate POIs with locations within an indoor or like area of interest. In some instances, one or more brand-specific visual signatures may, for example, be communicated by a suitable server (e.g., visual assistance server 118 of FIG. 1, etc.), such as in response to a request from a mobile device.

At operation 704, visual features may, for example, be extracted from one or more images captured via a camera sensor of a mobile device. For example, visual features may be extracted from a series of video frames obtained via a panning sequence to view one or more logos associated with an indoor or like area of interest. Visual features may be extracted using any suitable computer vision or like visual feature extraction techniques including, for example, SIFT, SURF, NFT, etc., corner detection-type techniques, proprietary or otherwise.

With regard to operation 706, extracted visual features may, for example, be matched with one or more received brand-specific visual signatures. For example, extracted visual features may be compared with reference logos in a suitable database (e.g., a visual assistance database, etc.) to determine if there is a match, such as in connection with suitable assistance information (e.g., an LCI, rough location of the device, etc.). A best or otherwise suitable candidate image of a logo representative of a brand-specific visual signature associated with a POI of interest may, for example, be selected, as was also indicated.

At operation 708, a location of a mobile device may be estimated based, at least in part, on a match between extracted visual features and one or more brand-specific visual signatures associated with one or more POIs of one or more known locations. For example, with knowledge of a mobile device orientation, such as while video frames are being captured, as discussed above, a pose of a mobile device may be estimated. Based, at least in part, on an estimated pose and known locations of one or more POIs, such as one or more shown POIs mapped to a floor plan of a particular indoor or like area of interest and associated with matched visual features, for example, an estimated location of a mobile device may be computed.

At operation 710, an estimated location of a mobile device may, for example, be refined based, at least in part, on at least one additional POI of one or more POIs of one or more known locations. For example, as previously mentioned, a refined position of a mobile device may be estimated to be at an intersection of pose lines of projected logo images, though claimed subject matter is not so limited. In some instances, an estimated distance from a mobile device to one or more POIs of interest may be computed, such as with knowledge of a size (e.g., actual, original, projected, etc.) of one or more detected logos, for example, using one or more appropriate techniques, as was also indicated.

Figure 8:
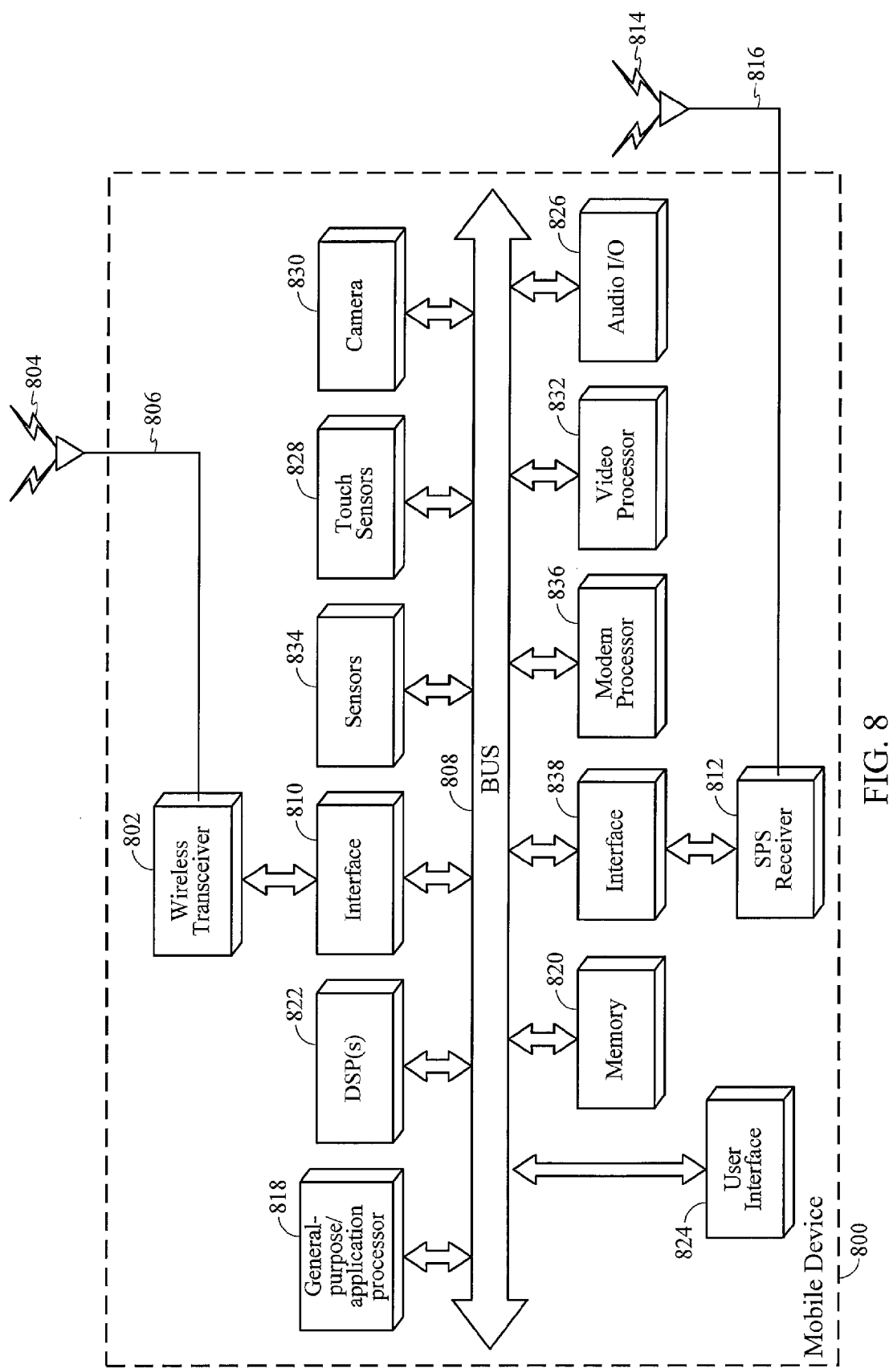
FIG. 8 is a schematic diagram illustrating an implementation of an example computing environment associated with a mobile device.

FIG. 8 is a schematic diagram of an implementation of an example computing environment associated with a mobile device that may be used, at least in part, to facilitate or support one or more operations or techniques for logo detection for positioning in an indoor or like environment. An example computing environment may comprise, for example, a mobile device 800 that may include one or more features or aspects of mobile device 102 of FIG. 1, though claimed subject matter is not so limited. For example, in some instances, mobile device 800 may comprise a wireless transceiver 802 capable of transmitting or receiving wireless signals, referenced generally at 804, such as via an antenna 806 over a suitable wireless communications network. Wireless transceiver 802 may, for example, be coupled or connected to a bus 808 via a wireless transceiver bus interface 810. Depending on an implementation, at times, wireless transceiver bus interface 810 may, for example, be at least partially integrated with wireless transceiver 802. Some implementations may include multiple wireless transceivers 802 or antennas 806 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 800 may, for example, comprise an SPS receiver 812 capable of receiving or acquiring one or more SPS signals 814, such as via an SPS antenna 816. SPS receiver 812 may process, in whole or in part, one or more acquired SPS signals 814 for estimating a location of mobile device 800. In some instances, one or more general-purpose application processors 818, memory 820, digital signal processor(s) (DSP) 822, or like specialized devices or processors not shown may be utilized to process acquired SPS signals 814, in whole or in part, calculate a location of mobile device 800, such as in conjunction with SPS receiver 812, or the like. Storage of SPS or other signals for implementing one or more positioning operations, such as in connection with logo detection, for example, may be performed, at least in part, in memory 820, suitable registers or buffers (not shown). Although not shown, it should be appreciated that in at least one implementation one or more processors 818, memory 820, DSPs 822, or like specialized devices or processors may comprise one or more image processing modules capable of extracting visual features from one or more images captured via a camera sensor, matching extracted visual features and one or more received brand-specific visual signatures, estimating a location of a mobile device based, at least in part, on a match between extracted visual features and one or more brand-specific visual signatures, or the like. It should also be noted that all or part of one or more image processing modules may be implemented using or otherwise including hardware, firmware, software, or any combination thereof.

As illustrated, DSP 822 may be coupled or connected to processor 818 and memory 820 via bus 808. Although not shown, in some instances, bus 808 may comprise one or more bus interfaces that may be integrated with one or more applicable components of mobile device 800, such as DSP 822, processor 818, memory 820, or the like. In various embodiments, one or more operations or functions described herein may be performed in response to execution of one or more machine-readable instructions stored in memory 820, such as on a computer-readable storage medium, such as RAM, ROM, FLASH, disc drive, etc., just to name a few examples. Instructions may, for example, be executable via processor 818, one or more specialized processors not shown, DSP 822, or the like. Memory 820 may comprise a non-transitory processor-readable memory, computer-readable memory, etc. that may store software code (e.g., programming code, instructions, etc.) that may be executable by processor 818, DSP 822, or the like to perform operations or functions described herein.

Mobile device 800 may comprise a user interface 824, which may include any one of several devices such as, for example, a speaker, microphone, display device, vibration device, keyboard, touch screen, etc., just to name a few examples. In at least one implementation, user interface 824 may enable a user to interact with one or more applications hosted on mobile device 800. For example, one or more devices of user interface 824 may store analog or digital signals on memory 820 to be further processed by DSP 822, processor 818, etc. in response to input or action from a user. Similarly, one or more applications hosted on mobile device 800 may store analog or digital signals in memory 820 to present an output signal to a user. In some implementations, mobile device 800 may optionally include a dedicated audio input/output (I/O) device 826 comprising, for example, a dedicated speaker, microphone, digital to analog circuitry, analog to digital circuitry, amplifiers, gain control, or the like. It should be understood, however, that this is merely an example of how audio I/O device 826 may be implemented, and that claimed subject matter is not limited in this respect. As seen, mobile device 800 may comprise one or more touch sensors 828 responsive to touching or like pressure applied on a keyboard, touch screen, or the like.

In an implementation, mobile device 800 may comprise, for example, a camera 830, dedicated or otherwise, such as for capturing still or moving imagery. Camera 830 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 818, DSP 822, or the like. Optionally or alternatively, a video processor 832, dedicated or otherwise, may perform conditioning, encoding, compression, or manipulation of signals representing one or more captured images. Additionally, video processor 832 may, for example, decode or decompress one or more stored images for presentation on a display (not shown) of mobile device 800.

Mobile device 800 may comprise one or more sensors 834 coupled or connected to bus 808, such as, for example, one or more inertial sensors, ambient environment sensors, or the like. Inertial sensors of sensors 834 may comprise, for example, one or more accelerometers (e.g., collectively responding to acceleration of mobile device 800 in one, two, or three dimensions, etc.), gyroscopes or magnetometers (e.g., to support one or more compass applications, etc.), etc., just to illustrate a few examples. Ambient environment sensors of mobile device 800 may comprise, for example, one or more temperature sensors, barometric pressure sensors, ambient light detectors, camera sensors, microphones, etc., just to name few examples. Sensors 834 may generate analog or digital signals that may be stored in memory 820 and may be processed by DSP 822, processor 818, etc., such as in support of one or more applications directed to positioning or navigation operations, communications, gaming or the like.

In a particular implementation, mobile device 800 may comprise a modem processor 836, dedicated or otherwise, capable of performing baseband processing of signals received or downconverted via wireless transceiver 802, SPS receiver 812, or the like. Similarly, modem processor 836 may perform baseband processing of signals to be upconverted for transmission via wireless transceiver 802, for example. In alternative implementations, instead of having a dedicated modem processor, baseband processing may be performed, at least in part, by processor 818, DSP 822, or the like. In addition, in some instances, an interface 838, although illustrated as a separate component, may be integrated, in whole or in part, with one or more applicable components of mobile device 800, such as bus 808 or SPS receiver 812, for example. Optionally or alternatively, SPS receiver 812 may be coupled or connected to bus 808 directly. It should be understood, however, that these are merely examples of components or structures that may perform baseband processing, and that claimed subject matter is not limited in this regard.

Figure 9:
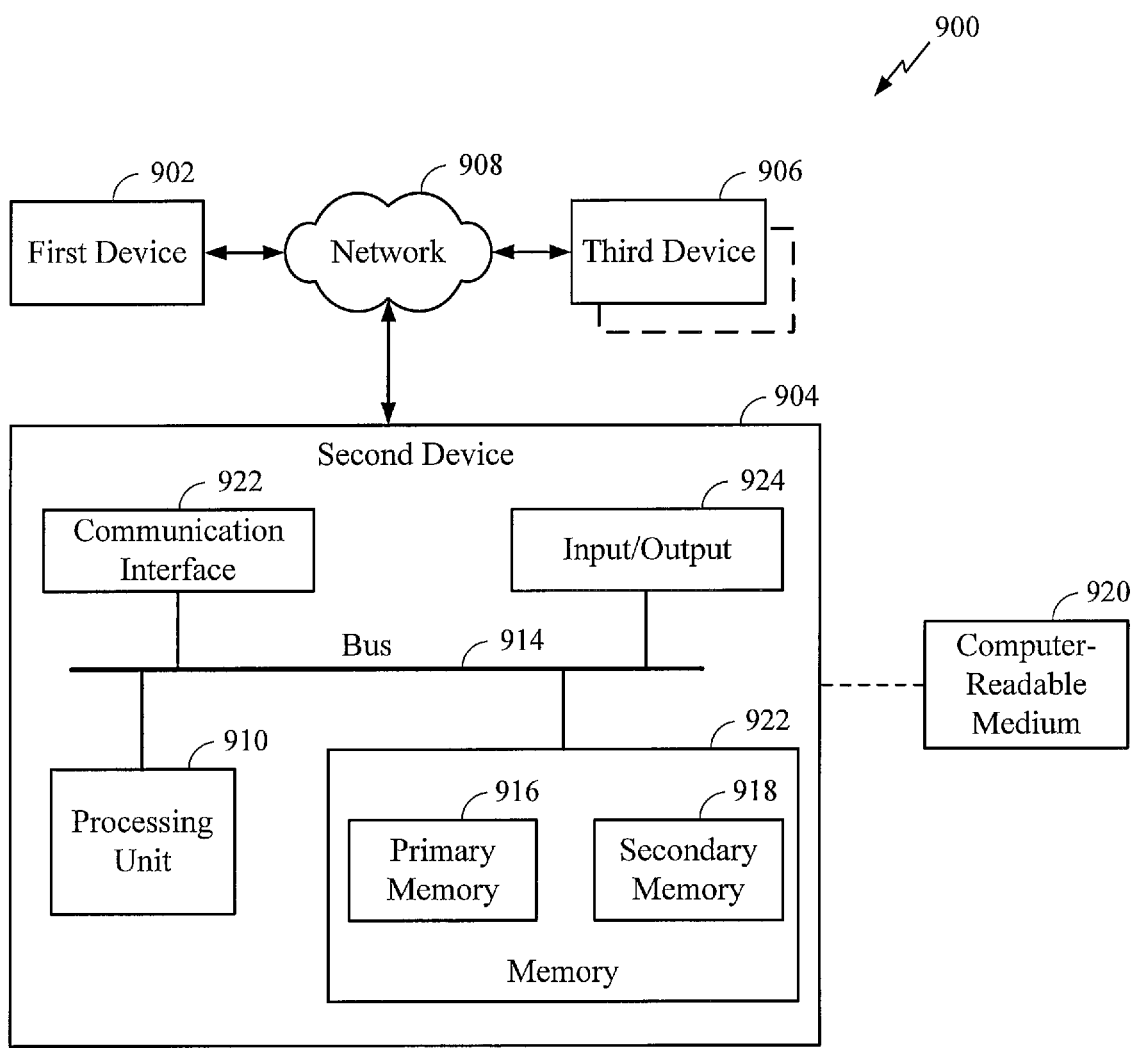
FIG. 9 is a schematic diagram illustrating an implementation of an example computing environment associated with a server.

FIG. 9 is a schematic diagram illustrating an implementation of an example computing environment or system 900 that may be associated with or include one or more servers or other devices capable of partially or substantially implementing or supporting one or more operations or processes for logo detection for positioning in an indoor or like environment, such as discussed above in connection with FIG. 1, for example. Computing environment 900 may include, for example, a first device 902, a second device 904, a third device 906, etc., which may be operatively coupled together via a communications network 908. In some instances, first device 902 may comprise a server capable of providing positioning assistance information, such as a base station almanac, for example. First device 902 may also comprise a server capable of providing an LCI to a requesting mobile device based, at least in part, on a rough estimate of a location of the mobile device. First device 902 may also comprise a server capable of providing indoor positioning assistance information relevant to a location of an LCI specified in a request from a mobile device. Second device 904 or third device 906 may comprise, for example, mobile devices, just to illustrate one possible implementation. In addition, communications network 908 may comprise one or more wireless transmitters, such as access points, femtocells, or the like. Of course, claimed subject matter is not limited in scope in these respects.

First device 902, second device 904, or third device 906 may be representative of any device, appliance, platform, or machine that may be capable of exchanging information over communications network 908. By way of example but not limitation, any of first device 902, second device 904, or third device 906 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 902, 904, and 906, respectively, may comprise one or more of a mobile device, wireless transmitter or receiver, server, etc. in accordance with example implementations described herein.

In an implementation, communications network 908 may be representative of one or more communication links, processes, or resources capable of supporting an exchange of information between at least two of first device 902, second device 904, or third device 906. By way of example but not limitation, communications network 908 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 906, there may be additional like devices operatively coupled to communications network 908. It is also recognized that all or part of various devices or networks shown in computing environment 900, or processes or methods, as described herein, may be implemented using or otherwise including hardware, firmware, software, or any combination thereof.

By way of example but not limitation, second device 904 may include at least one processing unit 910 that may be operatively coupled to a memory 912 via a bus 914. Processing unit 910 may be representative of one or more circuits capable of performing at least a portion of a suitable computing procedure or process. For example, processing unit 910 may include one or more processors, controllers, microprocessors, microcontrollers, application specific integrated circuits, digital signal processors, programmable logic devices, field programmable gate arrays, or the like, or any combination thereof.

Memory 912 may be representative of any information storage mechanism or appliance. Memory 912 may include, for example, a primary memory 916 and a secondary memory 918. Primary memory 916 may include, for example, a random access memory, read only memory, etc. While illustrated in this example as being separate from processing unit 910, it should be understood that all or part of primary memory 916 may be provided within or otherwise co-located/coupled with processing unit 910. Secondary memory 918 may include, for example, same or similar type of memory as primary memory or one or more information storage devices or systems, such as, for example, a disk drive, an optical disc drive, a tape drive, a solid state memory drive, etc. In certain implementations, secondary memory 918 may be operatively receptive of, or otherwise configurable to couple to, a computer-readable medium 920. Computer-readable medium 920 may include, for example, any non-transitory storage medium that may carry or make accessible information, code, or instructions for one or more of devices in computing environment 900. Computer-readable medium 920 may also be referred to as a storage medium.

Second device 904 may include, for example, a communication interface 922 that may provide for or otherwise support an operative coupling of second device 904 to at least communications network 908. By way of example but not limitation, communication interface 922 may include a network interface device or card, a modem, a router, a switch, a transceiver, and the like. Second device 904 may also include, for example, an input/output device 924. Input/output device 924 may be representative of one or more devices or features that may be configurable to accept or otherwise introduce human or machine inputs, or one or more devices or features that may be capable of delivering or otherwise providing for human or machine outputs. By way of example but not limitation, input/output device 924 may include an operatively configured display, speaker, keyboard, mouse, trackball, touch screen, information port, or the like.

Methodologies described herein may be implemented by various means depending upon applications according to particular features or examples. For example, methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, methodologies may be implemented with modules (e.g., procedures, functions, etc.) having instructions that perform functions described herein. Any computer-readable medium tangibly embodying instructions may be used in implementing methodologies described herein. For example, software codes may be stored in a memory and executed by a processor. Memory may be implemented within the processor or external to the processor. As used herein the term "memory" may refer to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, obtaining assistance information, extending cellular telephone service into a business or home, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example, and may provide a mobile device access to a larger cellular telecommunication network by way of another broadband network, such as the Internet. However, such details relating to femtocells are merely examples, and claimed subject matter is not so limited.

Techniques described herein may be used with an SPS that includes any one of several GNSS or combinations of GNSS. Furthermore, techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal, etc.). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "space vehicle" (SV), as used herein, is intended to include terrestrial transmitters acting as pseudolites, equivalents of pseudolites, and possibly others. The terms "SPS signals" or "SV signals", as used herein, is intended to include SPS-like signals from terrestrial transmitters, including terrestrial transmitters acting as pseudolites or equivalents of pseudolites.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A mobile-based method for estimating a location of a mobile device, comprising:
    receiving, at said mobile device, one or more brand-specific visual signatures associated with one or more points of interest (POIs) of one or more known locations;
    extracting visual features from one or more images captured via a camera sensor of said mobile device;
    matching said extracted visual features and said one or more received brand-specific visual signatures; and
    estimating a location of said mobile device based, at least in part, on:
        a match between said extracted visual features and said one or more brand-specific visual signatures associated with said one or more POIs of one or more known locations, and
        an estimation of a pose of said mobile device while said one or more images are captured via said camera sensor;
    wherein said pose is estimated based, at least in part, on a line of sight angle of said mobile device relative to two or more POIs, and said line of sight angle comprises an angle formed between an optical axis extending axially from a camera lens of said mobile device to a logo observation line along which at least a portion of a logo is presented.

2. The method of claim 1, further comprising:
    determining a location context identifier (LCI) identifying an area based, at least in part, on a rough location of said mobile device; and
    identifying said one or more POIs within said area based, at least in part, on said determined LCI.

3. The method of claim 2, further comprising storing said one or more brand-specific visual signatures associated with said one or more identified POIs in memory.

4. The method of claim 1, wherein said location of said mobile device is estimated in connection with a map for indoor environment.

5. The method of claim 4, wherein said indoor environment comprises a venue.

6. The method of claim 1, wherein said visual features are extracted via an application of one or more visual feature extraction techniques.

7. The method of claim 1, wherein said one or more brand-specific visual signatures are associated with said one or more POIs via a database accessible by said mobile device.

8. The method of claim 7, wherein said database comprises a visual assistance database comprising at least one of: an identifier (ID) of an indoor environment; location information relating to said one or more POIs; said extracted visual features of said one or more brand-specific visual signatures; or any combination thereof.

9. The method of claim 1, wherein said one or more images comprises a series of video frames obtained via a panning sequence to view said one or more brand-specific visual signatures.

10. The method of claim 1, wherein said location is estimated based, at least in part, on said one or more POIs shown in said one or more images.

11. An apparatus comprising: a mobile device comprising:
    a wireless transceiver to receive visual assistance information;
    a camera sensor to capture one or more images; and
    at least one image processing module coupled to a memory to process said one or more images to: extract visual features from said one or more images captured via said camera sensor; and estimate a location of said mobile device based, at least in part, on:
    a match between said extracted visual features and one or more brand-specific visual signatures associated with one or more POIs of one or more known locations, and
    an estimation of a pose of said mobile device while said one or more images are captured via said camera sensor;
    wherein said pose is estimated based, at least in part, on a line of sight angle of said mobile device relative to two or more POIs, and said line of sight angle comprises an angle formed between an optical axis extending axially from a camera lens of said mobile device to a logo observation line along which at least a portion of a logo is presented.

12. The apparatus of claim 11, wherein said pose is estimated based, at least in part, on a line of sight angle of said mobile device relative to two or more POIs.

13. The apparatus of claim 11, wherein said one or more brand-specific visual signatures are associated with said one or more POIs via an assistance database accessible by said mobile device and comprising at least one of: an identifier (ID) of an indoor environment; location information relating to said one or more POIs; said extracted visual features of said one or more brand-specific visual signatures; or any combination thereof.

14. The apparatus of claim 11, wherein said at least one image processing module further to:
    determine a Location Context Identifier ("LCI") identifying an area based, at least in part, on a rough location of said mobile device; and
    identify said one or more POIs within said area based, at least in part, on said determined LCI.

15. An apparatus for estimating a location of a mobile device comprising:
    receiving means for receiving, at a mobile device of said apparatus, one or more brand-specific visual signatures associated with one or more points of interest (POIs) of one or more known locations;
    extraction means for extracting visual features from one or more images captured via a camera sensor of said mobile device;
    matching means for matching said extracted visual features and said one or more received brand-specific visual signatures; and
    estimation means for estimating a location of said mobile device based, at least in part, on:
    a match between said extracted visual features and said one or more brand-specific visual signatures associated with said one or more POIs of one or more known locations, and
    an estimation of a pose of said mobile device while said one or more images are captured via said camera sensor;
    wherein said pose is estimated based, at least in part, on a line of sight angle of said mobile device relative to two or more POIs, and said line of sight angle comprises an angle formed between an optical axis extending axially from a camera lens of said mobile device to a logo observation line along which at least a portion of a logo is presented.

16. The apparatus of claim 15, wherein said pose is estimated based, at least in part, on a line of sight angle relative to two or more POIs.

17. The apparatus of claim 15, and further comprising comparison means for comparing said extracted visual features with said one or more brand-specific visual signatures to determine if there is a match between said extracted visual features and said one or more POIs.

18. The apparatus of claim 15, wherein said visual features are extracted via an application of one or more visual feature extraction techniques.

19. The apparatus of claim 15, wherein said one or more known locations are obtained via one or more maps for indoor environment.

20. The apparatus of claim 19, wherein said indoor environment comprises a venue.

21. The apparatus of claim 15, wherein said one or more brand-specific visual signatures are associated with said one or more POIs via a database accessible by said mobile device.

22. The apparatus of claim 21, wherein said database comprises a visual assistance database comprising at least one of: an identifier (ID) of an indoor environment; location information relating to said one or more POIs; said extracted visual features of said one or more brand-specific visual signatures; or any combination thereof.

23. The apparatus of claim 15, and further comprising:
    determination means for determining a Location Context Identifier ("LCI") identifying an area based, at least in part, on a rough location of said mobile device; and
    identification means for identifying said one or more POIs within said area based, at least in part, on said determined LCI.

24. The apparatus of claim 23, and further comprising storage means for storing said one or more brand-specific visual signatures associated with said one or more identified POIs in memory.

25. An article comprising:
    a non-transitory storage medium having instructions stored thereon executable by a special purpose computing platform at a mobile device to:
    extract visual features from one or more images captured via a camera sensor of said mobile device; and
    estimate a location of said mobile device based, at least in part, on:
    a match between said extracted visual features and one or more brand-specific visual signatures associated with one or more points of interest (POIs) of one or more known locations, and
    an estimation of a pose of said mobile device while said one or more images are captured via said camera sensor;
    wherein said pose is estimated based, at least in part, on a line of sight angle of said mobile device relative to two or more POIs, and said line of sight angle comprises an angle formed between an optical axis extending axially from a camera lens of said mobile device to a logo observation line along which at least a portion of a logo is presented.

26. The article of claim 25, wherein said pose is estimated based, at least in part, on a line of sight angle relative to two or more POIs.

27. The article of claim 25, wherein said one or more brand-specific visual signatures are associated with said one or more POIs via an assistance database accessible by said mobile device and comprising at least one of: an identifier (ID) of an indoor environment; location information relating to said one or more POIs; said extracted visual features of said one or more brand-specific visual signatures; or any combination thereof.

28. The article of claim 25, wherein said storage medium further comprises instructions to:
    determine an LCI identifying an area based, at least in part, on a rough location of said mobile device; and
    identify said one or more POIs within said area based, at least in part, on said determined LCI.

* * * * *